United States Patent
Mizukoshi

(10) Patent No.: US 11,753,243 B2
(45) Date of Patent: Sep. 12, 2023

(54) STORAGE DEVICE AND STORAGE METHOD

(71) Applicant: FUJI CORPORATION, Chiryu (JP)

(72) Inventor: Tsuyoshi Mizukoshi, Chiryu (JP)

(73) Assignee: FUJI CORPORATION, Chiryu (JP)

( * ) Notice: Subject to any disclaimer, the term of this patent is extended or adjusted under 35 U.S.C. 154(b) by 582 days.

(21) Appl. No.: 16/958,875

(22) PCT Filed: Jan. 12, 2018

(86) PCT No.: PCT/JP2018/000686
§ 371 (c)(1),
(2) Date: Jun. 29, 2020

(87) PCT Pub. No.: WO2019/138548
PCT Pub. Date: Jul. 18, 2019

(65) Prior Publication Data
US 2020/0339353 A1 Oct. 29, 2020

(51) Int. Cl.
*B65G 1/137* (2006.01)
*B65G 65/00* (2006.01)
*G06K 7/10* (2006.01)

(52) U.S. Cl.
CPC ........... *B65G 1/137* (2013.01); *B65G 65/005* (2013.01); *G06K 7/10366* (2013.01)

(58) Field of Classification Search
None
See application file for complete search history.

(56) References Cited

U.S. PATENT DOCUMENTS 7,151,979 B2 * 12/2006 Andersen ......... G06K 19/07749
  700/214
7,155,304 B1 * 12/2006 Charych .............. H01Q 1/2216
  700/214

(Continued)

FOREIGN PATENT DOCUMENTS

EP   1 818 286 A1   8/2007
EP   2 511 200 A1   10/2012

(Continued)

OTHER PUBLICATIONS

International Search Report dated Mar. 27, 2018 in PCT/JP2018/000686 filed on Jan. 12, 2018, citing documents AA-AB and AO-AS therein, 2 pages.

*Primary Examiner* — Jonathan M Dager
(74) *Attorney, Agent, or Firm* — Oblon, McClelland, Maier & Neustadt, L.L.P.

(57) ABSTRACT

A storage device disclosed in the present description includes an acquisition section and a management section. When a case accommodating multiple accommodatable objects is loaded into a storage container, the acquisition section performs wireless communication with both a first wireless tag attached to the case and a second wireless tag attached to each of the multiple accommodatable objects. The acquisition section acquires specific information for specifying the case memorized in the first wireless tag and identification information for identifying each of the multiple accommodatable objects memorized in the second wireless tag. The management section associates the specific information and the identification information acquired by the acquisition section with each other to manage a correspondence relationship between the specific information and the identification information.

8 Claims, 8 Drawing Sheets

(56) References Cited

U.S. PATENT DOCUMENTS

| | | | | |
|---|---|---|---|---|
| 7,669,763 | B2* | 3/2010 | Ernesti | G06Q 20/203 |
| | | | | 235/487 |
| 7,916,028 | B2* | 3/2011 | Oberle | G06Q 10/087 |
| | | | | 705/28 |
| 9,477,938 | B1* | 10/2016 | Russell | G06Q 10/087 |
| 9,908,701 | B2* | 3/2018 | Blumenau | B22D 33/00 |
| 10,169,058 | B2* | 1/2019 | Blumenau | G06F 9/45512 |
| 10,366,257 | B1* | 7/2019 | Kantor | G06Q 10/087 |
| 10,460,137 | B1* | 10/2019 | Landry, Sr. | G06Q 50/28 |
| 11,514,766 | B1* | 11/2022 | McDaniel | G08B 13/2485 |
| 2004/0111335 | A1* | 6/2004 | Black | G08B 13/2462 |
| | | | | 705/28 |
| 2004/0260423 | A1* | 12/2004 | Lee | B65G 1/1378 |
| | | | | 700/214 |
| 2005/0246248 | A1* | 11/2005 | Vesuna | G06K 7/0008 |
| | | | | 705/28 |
| 2006/0025883 | A1* | 2/2006 | Reeves | G06Q 10/08 |
| | | | | 700/216 |
| 2006/0287759 | A1* | 12/2006 | Charych | B66F 9/0755 |
| | | | | 700/213 |
| 2007/0126578 | A1* | 6/2007 | Broussard | G06Q 10/087 |
| | | | | 705/28 |
| 2008/0024274 | A1* | 1/2008 | Ishida | B65G 1/1371 |
| | | | | 340/10.1 |
| 2008/0035727 | A1* | 2/2008 | Stanzel | G06Q 10/087 |
| | | | | 235/385 |
| 2008/0055084 | A1* | 3/2008 | Bodin | G06Q 10/08 |
| | | | | 340/8.1 |
| 2008/0106377 | A1* | 5/2008 | Flores | G06Q 10/087 |
| | | | | 340/5.92 |
| 2008/0211673 | A1* | 9/2008 | Himberger | G08B 13/2462 |
| | | | | 340/572.1 |
| 2009/0277199 | A1* | 11/2009 | Manas | F25D 29/00 |
| | | | | 62/441 |
| 2011/0035045 | A1* | 2/2011 | Walter | F02M 63/0036 |
| | | | | 700/214 |
| 2012/0075071 | A1* | 3/2012 | Liu | B65D 19/001 |
| | | | | 235/492 |
| 2012/0283868 | A1* | 11/2012 | Rutt | G06Q 10/083 |
| | | | | 700/214 |
| 2014/0012773 | A1* | 1/2014 | Matthews | G06Q 10/0833 |
| | | | | 705/333 |
| 2014/0015641 | A1* | 1/2014 | White | G06K 19/0715 |
| | | | | 340/10.1 |
| 2014/0112741 | A1* | 4/2014 | Yoshioka | H01L 21/67733 |
| | | | | 414/222.01 |
| 2014/0247116 | A1* | 9/2014 | Davidson | G05D 1/0261 |
| | | | | 901/1 |
| 2017/0043947 | A1* | 2/2017 | Munholland | B65D 1/133 |
| 2017/0301004 | A1* | 10/2017 | Chirnomas | G07F 11/26 |
| 2018/0130011 | A1* | 5/2018 | Jacobsson | H05K 13/021 |
| 2018/0215534 | A1* | 8/2018 | Munholland | B65G 17/485 |
| 2018/0218320 | A1* | 8/2018 | Lee | G06K 17/0022 |
| 2019/0002202 | A1* | 1/2019 | Collin | B65G 1/06 |
| 2020/0104790 | A1* | 4/2020 | Chung | H04W 4/029 |
| 2020/0371514 | A1* | 11/2020 | Dorval | G05D 1/0297 |
| 2021/0200210 | A1* | 7/2021 | Gil | G05D 1/0088 |
| 2021/0302961 | A1* | 9/2021 | Iwaki | B60L 53/62 |
| 2022/0055834 | A1* | 2/2022 | Mietusch | B65G 1/045 |
| 2022/0207473 | A1* | 6/2022 | Freeman | G06Q 10/0833 |
| 2022/0374566 | A1* | 11/2022 | Ishikawa | H05K 13/085 |

FOREIGN PATENT DOCUMENTS

| | | |
|---|---|---|
| JP | 2008-266002 A | 11/2008 |
| JP | 2009-167010 A | 7/2009 |
| JP | 2012-182246 A | 9/2012 |
| JP | 2013-206970 A | 10/2013 |
| JP | 2016-531449 A | 10/2016 |
| WO | WO 2006/059674 A1 | 6/2006 |

* cited by examiner

Fig. 7

| SPECIFIC INFORMATION | IDENTIFICATION INFORMATION | ACCOMMODATABLE OBJECT INFORMATION | LOADING AND UNLOADING INFORMATION | REGION INFORMATION | POSITIONAL INFORMATION | STORAGE INFORMATION |
|---|---|---|---|---|---|---|
| ID1 | ID21 | P1 | LOADING: 17/12/18 08:00<br>UNLOADING: 00/00/00 00:00 | A11 | T1B1 | TEMPERATURE: TE1<br>HUMIDITY: HU1 |
| | ID22 | P1 | LOADING: 17/12/18 08:00<br>UNLOADING: 00/00/00 00:00 | A12 | | |
| | ID23 | P2 | LOADING: 17/12/18 08:00<br>UNLOADING: 00/00/00 00:00 | A13 | | |
| | ID24 | P1 | LOADING: 17/12/18 08:00<br>UNLOADING: 00/00/00 00:00 | A14 | | |
| | ID25 | P1 | LOADING: 17/12/18 08:00<br>UNLOADING: 00/00/00 00:00 | A15 | | |
| | ID26 | P1 | LOADING: 17/12/18 08:00<br>UNLOADING: 00/00/00 00:00 | A16 | | |

| SPECIFIC INFORMATION | IDENTIFICATION INFORMATION | ACCOMMODATABLE OBJECT INFORMATION | LOADING AND UNLOADING INFORMATION | REGION INFORMATION | POSITIONAL INFORMATION | STORAGE INFORMATION |
|---|---|---|---|---|---|---|
| ID1 | ID211 | P1 | LOADING: 17/12/18 08:00<br>UNLOADING: 00/00/00 00:00 | A11 | T1B1 | TEMPERATURE: TE1<br>HUMIDITY: HU1 |
| | ID212 | P2 | LOADING: 17/12/18 08:00<br>UNLOADING: 00/00/00 00:00 | A11 | | |
| | ID213 | P1 | LOADING: 17/12/18 08:00<br>UNLOADING: 00/00/00 00:00 | A11 | | |
| | ID22 | P1 | LOADING: 17/12/18 08:00<br>UNLOADING: 00/00/00 00:00 | A12 | | |
| | .. | .. | .. | .. | | |

↙ CP1

STORAGE DEVICE AND STORAGE METHOD

TECHNICAL FIELD

The present description discloses a technology related to a storage device and a storage method.

BACKGROUND ART

Patent Literature 1 discloses a method of taking out and delivering an object which is stored in a component stocker used for surface mounting. Specifically, an identification tag is attached to a bin, a component tape reel included in the bin, and the like, and the identification tag includes a wireless tag. Identification of the component tape reel is performed, for example, by scanning the identification tag attached to the bin. In addition, positional information in the component stocker and identification information, of which information being the bin, the component tape reel included in the bin, or the like, are associated with each other, and it becomes possible to store the bin and to take out the bin. When the bin is received at an opening section or the like of the component stoker, it is recommended that a tape reel ID of the component tape reel provided in the bin is automatically determined by using at least one of an actuator and a bar code scanner provided in the component stocker.

Patent Literature 2 discloses a reel component supply method in which a reel is conveyed from a reel stocker to a production line and a component stored in the reel is supplied. Specifically, a reel wireless tag in which reel identification information is recorded is attached to a side face of the reel. In addition, a case wireless tag in which case identification information is recorded is attached to a bottom face of a conveyance case. Further, a table sensor of reading the reel identification information recorded in the reel wireless tag and the case identification information recorded in the case wireless tag is provided on an upper face of a loading table.

PATENT LITERATURE

Patent Literature 1: JP-T-2016-531449
Patent Literature 2: JP-A-2012-182246

BRIEF SUMMARY

Technical Problem

In the recommended method described in Patent Literature 1, it is necessary to associate a bar code attached to a case (bin) with a bar code attached to each of multiple accommodatable objects (component tape reels) accommodated in the case (bin) before loading. In the method, the bar code attached to the case (bin) is read when receiving the case (bin) at the opening section or the like of the stocker, so that the multiple accommodatable objects (the component tape reels) accommodated in the case (bin) are managed.

However, since this method requires for performing such an associating operation before the loading, which turns out the associating operation being complicated. In addition, in a case where some of the multiple accommodatable objects (the component tape reels) accommodated in the case (bin) are unloaded, the associating operation needs to be performed again after some of the accommodatable objects (the component tape reels) are unloaded. In Patent Literature 2, at the time of loading, reading both the reel identification information recorded in the reel wireless tag and the case identification information recorded in the case wireless tag is not described and not suggested.

In view of the above circumstances, the present description discloses a storage device and a storage method capable of easily managing a case and each of multiple accommodatable objects by associating with each other when the case accommodating the multiple accommodatable objects is loaded in a storage container.

Solution to Problem

The present description discloses a storage device including an acquisition section and a management section. When a case accommodating multiple accommodatable objects is loaded into a storage container, the acquisition section performs wireless communication with both a first wireless tag attached to the case and a second wireless tag attached to each of the multiple accommodatable objects by using a wireless device provided at an entrance of the storage container. The acquisition section acquires specific information for specifying the case memorized in the first wireless tag and identification information for identifying each of the multiple accommodatable objects memorized in the second wireless tag. The management section associates the specific information and the identification information acquired by the acquisition section with each other to manage a correspondence relationship between the specific information and the identification information.

In addition, the present description discloses a storage method including an acquisition step and a management step. In the acquisition step, when a case accommodating multiple accommodatable objects is loaded into a storage container, wireless communication is performed with both a first wireless tag attached to the case and a second wireless tag attached to each of the multiple accommodatable objects by using a wireless device provided at an entrance of the storage container. In the acquisition step, specific information for specifying the case memorized in the first wireless tag and identification information for identifying each of the multiple accommodatable objects memorized in the second wireless tag are acquired. In the management step, the specific information and the identification information acquired in the acquisition step are associated with each other to manage a correspondence relationship between the specific information and the identification information.

Advantageous Effects

With the above-described storage device, the acquisition section and the management section are provided. Thus, when the case accommodating the multiple accommodatable objects is loaded into the storage container, the storage device can acquire both the specific information and the identification information, and can easily manage the case and each of the multiple accommodatable objects by associating with each other. The above description for the storage device also can be applied to the storage method in the same manner.

BRIEF DESCRIPTION OF DRAWINGS

FIG. 2B is a perspective view illustrating an example of case 21 accommodating reel 22a.

FIG. 2C is a perspective view illustrating another example of case 21 accommodating reel 22a.

FIG. 7 is a schematic diagram illustrating an example of correspondence relationship CP1.

FIG. 8 is a schematic diagram illustrating another example of correspondence relationship CP1.

DESCRIPTION OF EMBODIMENTS

1. Embodiments

Figure 1:
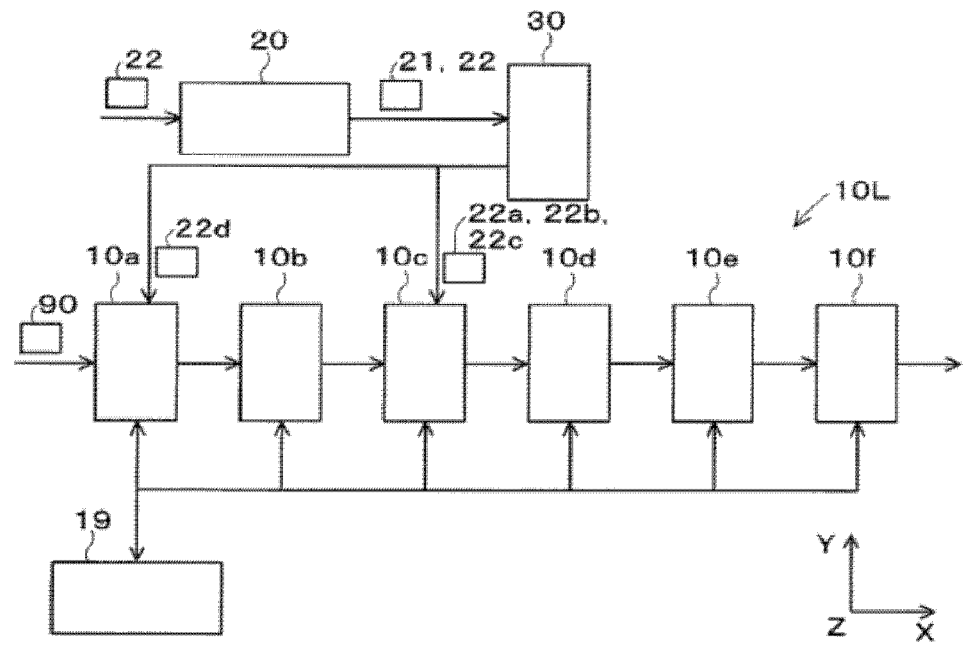
FIG. 1 is a schematic diagram illustrating a configuration example of board work line 10L, arrival area 20, and storage container 30.
Figure 2A:
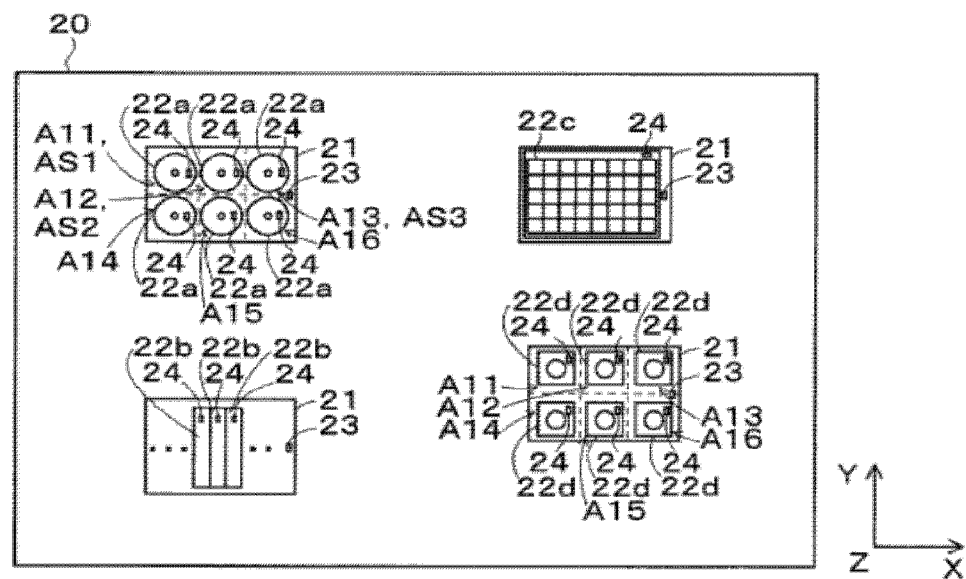
FIG. 2A is a plan view illustrating an example of a state in which multiple accommodatable objects 22 are accommodated in case 21 in arrival area 20.

As illustrated in FIGS. 1 and 2A, in the present embodiment, multiple accommodatable objects 22 are accommodated in case 21 in arrival area 20. Multiple accommodatable objects 22 are loaded in storage container 30 in a state of being accommodated in case 21, and storage device 40 manages case 21 and each of multiple accommodatable objects 22 by associating with each other. In the present embodiment, multiple accommodatable objects 22 accommodated in storage container 30 are supplied to board work line 10L.

1-1. Board Work Line 10L

Board work line 10L performs a predetermined operation on board 90. As illustrated in FIG. 1, in the present embodiment, board work line 10L includes multiple (six) work machines of printer 10a, printing inspector 10b, component mounter 10c, appearance inspector 10d, reflow furnace 10e, and function inspector 10f. Multiple (six) work machines are arranged from the upstream side in order of printer 10a, printing inspector 10b, component mounter 10c, appearance inspector 10d, reflow furnace 10e, and function inspector 10f. Board 90 is carried into printer 10a positioned at a leading end of board work line 10L. Board 90 is conveyed to the downstream side by a board conveyance device (not illustrated) of board work line 10L, and is carried out from function inspector 10f positioned at an end of board work line 10L.

Printer 10a prints paste-like solder at a mounting position of a component in board 90. The solder printed on board 90 has a predetermined viscosity, and the solder functions as a bonding material for bonding board 90 and the component to be mounted on board 90. As illustrated in the illustrated 2A, solder container 22d accommodates solder. As solder container 22d, for example, a bottomed tubular shape or tubular sealable container can be used. Printing inspector 10b inspects a print state of the solder printed by printer 10a. Component mounter 10c mounts the component on the solder printed by printer 10a. Component mounter 10c may be one, or may be multiple ones. In a case where multiple component mounters 10c are provided, components can be shared and mounted by multiple component mounter s 10c.

Component mounter 10c includes a component supply device (not illustrated) which supplies components to be mounted on board 90. The components can be supplied, for example, by feeder 22b, trays 22c, and the like including reel 22a as illustrated in FIG. 2A. Reel 22a is wound by a component tape (a carrier tape) for accommodating the components. The component tape may be a paper tape or an embossed tape. Reel 22a is rotatably and detachably provided on feeder 22b. A tip portion of the component tape is pulled out to a component pickup section provided in feeder 22b, and the components are subsequently supplied. Reel 22a can supply relatively small components such as chip components, for example. Multiple components are arranged in tray 22c. Tray 22c can supply a packaged component such as a quad flat package (QFP), a ball grid array (BGA), and the like, for example.

Appearance inspector 10d inspects a mounting state of the components mounted by component mounter 10c. Specifically, appearance inspector 10d recognizes the mounting state of the components on board 90 such as appropriateness of the component mounted on board 90, a mounting position and an orientation of the component, and the like, and transmits the degree of the mounting state to host computer 19 together with the good or bad of the mounting state of the components. Reflow furnace 10e heats board 90, on which the components are mounted by component mounter 10c and melts the solder to performs soldering. Function inspector 10f causes reflow furnace 10e to perform function inspection of soldered board 90. Specifically, function inspector 10f applies a predetermined input signal to board 90 to acquire an output signal in response to the input signal. Based on the acquired output signal, function inspector 10f inspects whether a function as a circuit of board 90 is normal.

In this manner, by using the multiple (six) work machines, board work line 10L conveys board 90 in order and executes a production process including an inspection process to produce a board product. For example, in accordance with a type or the like of the board product to be produced, board work line 10L can appropriately add a work machine and appropriately change a configuration of board work line 10L. Board work line 10L may include, for example, a work machine such as a buffer device, a board supplying device, a board flipping device, a shield mounting device, an adhesive application device, and an ultraviolet ray irradiation device.

The multiple (six) work machines constituting board work line 10L and host computer 19 are connected in a communicable manner. Host computer 19 controls the multiple (six) work machines constituting board work line 10L, and monitors an operation status of board work line 10L. Various data for controlling the multiple (six) work machines are memorized in host computer 19. Host computer 19 transmits the data to the multiple (six) work machines. In addition, the multiple (six) work machines constituting board work line 10L transmits the operation status and a production status to host computer 19.

1-2. Arrival Area 20

As illustrated in FIG. 2A, at least one case 21 is provided in arrival area 20. A shape of case 21 is not limited as long as case 21 can accommodate multiple (for example, six) accommodatable objects 22. Case 21 can be formed in various shapes such as a cube shape, a rectangular parallelepiped shape, and a cylindrical shape, for example. Further, at least one surface (for example, an upper face) of case 21 may be opened to carry in and out multiple (six) accommodatable objects 22. At least one surface (for example, the upper face) of case 21 may be openable and closable to carry in and out multiple (six) accommodatable objects 22.

Figure 3A:
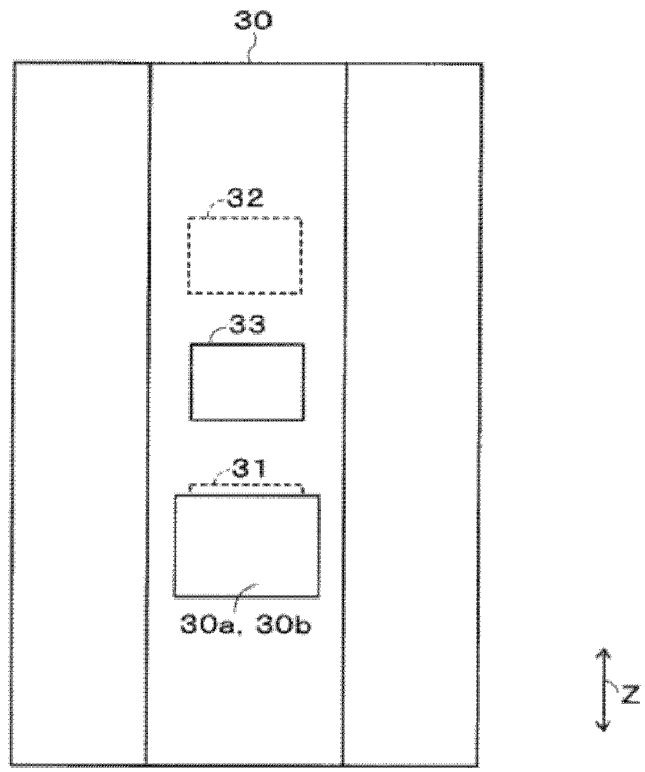
FIG. 3A is a front view illustrating an example of storage container 30.
Figure 3B:
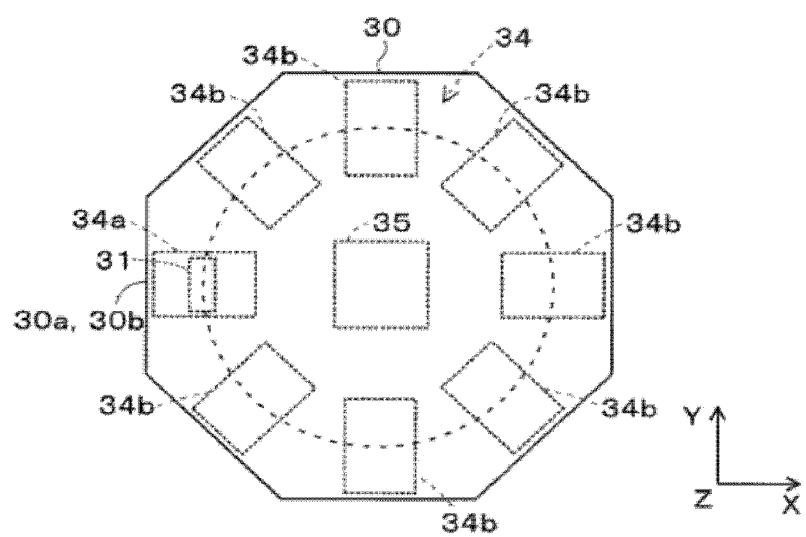
FIG. 3B is a plan view illustrating the example of storage container 30.

First wireless tag 23 of a radio frequency identifier (RFID) is attached to case 21. The RFID can transmit and receive information by wireless communication between first wireless tag 23 which memorizes identification information (referred to as specific information ID1 in the present embodiment) and a wireless device (wireless device 31 in the present embodiment). The specific information ID1 is information for specifying case 21, and wireless device 31 is provided at entrance 30a of storage container 30, as illustrated in FIGS. 3A and 3B. In the RFID, wireless device 31 can read out information memorized in first wireless tag 23 in a contactless manner by using radio waves or the like. In addition, wireless device 31 can write information into first wireless tag 23 in a contactless manner by using radio waves or the like.

First wireless tag 23 is preferably a passive tag of driving a radio wave radiated from wireless device 31 as an energy source. First wireless tag 23 may be an active tag incorporating drive power, and first wireless tag 23 may be a semi-active tag combining a passive tag and an active tag. In addition, a method of transmitting the radio wave is not limited. Further, first wireless tag 23 can memorize various pieces of information in addition to specific information ID1. The above description for first wireless tag 23 also can be applied to second wireless tag 24 in the same manner. In a case where case 21 is hermetically sealed, case 21 may be formed of a material having radio wave transparency. In this case, for example, a resin case or the like can be used as case 21.

Multiple (six) accommodatable objects 22 are not limited. For example, in the present embodiment, multiple (six) accommodatable objects 22 are supplied to board work line 10L. As described above, board work line 10L includes printer 10a which prints paste-like solder at a mounting position of a component on board 90 and at least one component mounter 10c which mounts the component on the solder printed by printer 10a. In this case, multiple (six) accommodatable objects 22 are preferably reel 22a around which a component tape for accommodating the component is wound, feeder 22b in which reel 22a is rotatably and detachably provided, tray 22c in which the components are arranged, or solder container 22d which accommodates the solder. With the present embodiment, storage device 40 can manage case 21 and each of above-described multiple (six) accommodatable objects 22 to be supplied to board work line 10L by associating with each other.

Second wireless tag 24 of RFID is attached to each of multiple (six) accommodatable objects 22. Second wireless tag 24 memorizes identification information ID21 to ID26 for identifying each of multiple (six) accommodatable objects 22. For example, when multiple (six) accommodatable objects 22 arrives in arrival area 20, a management device (not illustrated) issues identification information ID21 to ID26. By a supplier (a vendor), the management device reads information of a bar code and the like attached to multiple (six) accommodatable objects 22. The management device can also acquire accommodatable object information from a database (not illustrated) in which the accommodatable object information indicating information on multiple (six) accommodatable objects 22 is registered. The management device writes identification information ID21 and the accommodatable object information into second wireless tag 24. The management device writes the identification information and the accommodatable object information to other multiple (five) second wireless tags 24 in the same manner.

An operator in arrival area 20 attaches (for example, affixes) second wireless tag 24 in which at least identification information ID21 is memorized to corresponding accommodatable object 22. The operator attaches corresponding second wireless tags 24 to other multiple (five) accommodatable objects 22 in the same manner. The operator accommodates multiple (six) accommodatable objects 22 in case 21. The operator may attach second wireless tags 24 after accommodating multiple (six) accommodatable objects 22 in case 21. Further, at least a part of the operation performed by the operator described above may be automated by using a conveyance device (for example, a belt conveyor, an unmanned conveyance vehicle, or the like), an actuator (for example, a robot arm, or the like), a management device, or the like. On the other hand, at least a part of the operation performed by the management device described above can be performed by the operator.

FIG. 2A illustrates an example of a state in which multiple (six) reels 22a, which are multiple (six) accommodatable objects 22, are accommodated in case 21. FIG. 2A further illustrates an example of a state in which multiple (six) feeders 22b, which are multiple (six) accommodatable objects 22, are accommodated in case 21. For convenience of illustration, some (three feeders 22b) of multiple (six) feeders 22b are illustrated in FIG. 2. FIG. 2A further illustrates an example of a state in which multiple (six) trays 22c, which are multiple (six) accommodatable objects 22, are accommodated (stacked) in case 21. Each of multiple (six) trays 22c is stored in a packaging bag, and second wireless tag 24 is attached to the packaging bag of each of multiple (six) trays 22c. FIG. 2A further illustrates an example of a state in which multiple (six) solder containers 22d, which are multiple (six) accommodatable objects 22, are accommodated in case 21. FIG. 2A schematically illustrates an example of an accommodation state of multiple (six) accommodatable objects 22.

1-3. Storage Container 30

Multiple (six) accommodatable objects 22 are loaded into storage container 30 in a state of being accommodated in case 21. In addition, multiple (six) accommodatable objects 22 are stored in storage container 30 in a state of being accommodated in case 21. Multiple (six) accommodatable objects 22 are unloaded from storage container 30 in a state of being accommodated in case 21. A shape of storage container 30 is not limited. As illustrated in FIGS. 3A and 3B, storage container 30 of the present embodiment is formed in an octagonal prism shape.

Storage container 30 includes entrance 30a, exit 30b, wireless device 31, control device 32, display device 33, storage section 34, and actuator 35. Case 21 which accommodates multiple (six) accommodatable objects 22 is loaded in storage container 30 from entrance 30a, and is unloaded from exit 30b. In the present embodiment, entrance 30a and exit 30b are provided at a common opening section. Entrance 30a and exit 30b may be provided at different opening sections. Further, entrance 30a and exit 30b are formed to be larger than case 21 to be able to carry in and out case 21.

Wireless device 31 is provided at entrance 30a of storage container 30. When case 21 accommodating multiple (six) accommodatable objects 22 is loaded to storage container 30, wireless device 31 performs wireless communication with both first wireless tag 23 attached to case 21 and second wireless tag 24 attached to each of multiple (six) accommodatable objects 22. In addition, wireless device 31 may be provided at exit 30b of storage container 30. In this case, wireless device 31 can perform wireless communication with at least one of first wireless tag 23 and second wireless tag 24 when case 21 accommodating multiple (six) accommodatable objects 22 is unloaded from storage container 30.

As described above, in the present embodiment, entrance 30a and exit 30b are provided at a common opening section. Therefore, in the present embodiment, one wireless device 31 is provided at the opening section. Specifically, as illustrated in FIGS. 3A and 3B, one wireless device 31 is installed above workspace 34a close to the opening section, so one wireless device 31 can perform wireless communication with both first wireless tag 23 and second wireless tag 24 at the both times of case 21 being loaded and unloaded. Storage container 30 may include multiple wireless devices 31.

In control device 32, a control circuit is configured by including a known central processing device and a memory device (both are not illustrated). The central processing device is a central processing unit (CPU) and can perform various calculation processing. The memory device includes a first memory device and a second memory device. The first memory device is a volatile memory device (random access memory (RAM)), and the second memory device is a non-volatile memory device (read only memory (ROM)).

Further, control device 32 is communicatively connected to wireless device 31, display device 33, and actuator 35 and can control wireless device 31, display device 33, and actuator 35. For example, control device 32 may control wireless communication of wireless device 31. Further, control device 32 can acquire information transmitted and received between wireless device 31 and first wireless tag 23 from wireless device 31. Control device 32 can acquire information transmitted and received between wireless device 31 and second wireless tag 24 from wireless device 31.

Further, control device 32 is communicably connected to host computer 19 illustrated in FIG. 1. Host computer 19 notifies control device 32 of occurrence of changeover in board work line 10L, occurrence of shortage of articles (accommodatable objects 22) to be supplied to board work line 10L, or occurrence of a possibility of the changeover or the shortage of the articles (accommodatable objects 22). Based on the notification, control device 32 unloads case 21 in which at least one article (accommodatable object 22) necessary for board work line 10L is accommodated.

As display device 33, a known display device can be used, and displays various types of data so that the operator can visually recognize the data. For example, display device 33 displays accommodatable object information indicating information on multiple (six) accommodatable objects 22 accommodated in storage section 34 in accordance with an operation of the operator. The accommodatable object information may include, for example, types (for example, component types) of multiple (six) accommodatable objects 22, a format, the number of inventories (remaining number), a vendor name, an expiration date, and the like. Display device 33 of the present embodiment is configured by a touch panel, and display device 33 also functions as an input device of receiving various operations by the operator. For example, the operator can designate a desired article (accommodatable object 22) to be unloaded from storage container 30 by using the touch panel (display device 33 which functions as the input device). In this case, control device 32 unloads case 21 in which the designated article (accommodatable object 22) is accommodated.

Figure 4:
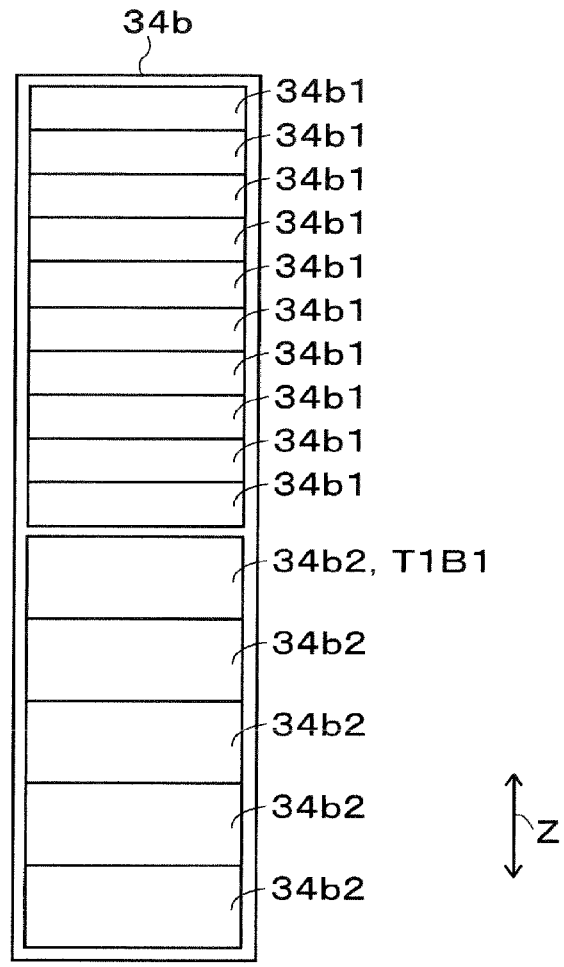
FIG. 4 is a front view illustrating an example of storage unit 34b.

As long as storage section 34 can store a storage object including case 21, a form of storage section 34 is not limited. As illustrated in FIG. 3B, in the present embodiment, storage section 34 includes multiple (seven in the present embodiment) storage units 34b, and multiple (seven) storage units 34b are arranged in a circular shape (more accurately, in a circular arc shape) in a vertical direction (a Z-axis direction) view. As illustrated in FIG. 4, each of multiple (seven) storage units 34b, storage spaces 34b1 and 34b2, in which the storage object including case 21 can be stored, is multiply provided along the vertical direction (the Z-axis direction). In the present embodiment, storage unit 34b includes two types of storage spaces 34b1 and 34b2, but storage unit 34b may include at least storage space 34b2 in which case 21 can be stored. In addition, storage container 30 may store the storage object in any storage units 34b among multiple (seven) storage units 34b.

In FIG. 3, for convenience of illustration, multiple (ten) storage spaces 34b1 and multiple (five) storage spaces 34b2 are illustrated. The number of storage spaces 34b1 and 34b2 is not limited. In addition, with respect to storage spaces 34b1 and 34b2, a size (a width, a depth, and a height) of a storage object to be stored is set. For example, a height of storage space 34b2 is set larger than that of storage space 34b1, and case 21 can be stored in storage space 34b2. On the other hand, a size of case 21 can be set in accordance with sizes of storage spaces 34b1 and 34b2. Further, case 21 of which an accommodation region for accommodatable object 22 is divided in accordance with the sizes of storage spaces 34b1 and 34b2 can be prepared. In any case, case 21 can accommodate at least one type of accommodatable object 22 having a size smaller than a size of case 21. For example, in a case of reel 22a, case 21 can accommodate multiple types of sizes of reels 22a smaller than the size of case 21 by using pins or the like, and can flexibly cope with changes in the reel type and the number of reels. The vertical direction (Z-axis direction) illustrates a direction orthogonal to a horizontal plane formed by the X-axis direction and the Y-axis direction.

In the vertical direction (the Z-axis direction) view, actuator 35 is provided inside multiple (seven) storage unit 34b to move the storage object by gripping the storage object. As long as actuator 35 can grip the storage object and move the storage object, actuator 35 is not limited. As actuator 35, for example, a robot arm (an articulated robot) or the like can be used. When case 21 is loaded, actuator 35 causes a gripping section (not illustrated) to grip case 21 carried into entrance 30a (workspace 34a), moves case 21 to storage unit 34b including storage space 34b2 in which case 21 can be stored, and stores case 21 in storage space 34b2. In addition, when case 21 is unloaded, actuator 35 causes the gripping section to grip case 21 stored in storage space 34b2 and moves case 21 to exit 30b (workspace 34a), so that case 21 is carried out.

With the present embodiment, storage container 30 includes storage section 34 and actuator 35. Storage section 34 includes multiple (seven) storage units 34b, and multiple (seven) storage units 34b are arranged in a circular shape in the vertical direction (the Z-axis direction) view. Further, in the vertical direction (the Z-axis direction) view, actuator 35 is provided inside multiple (seven) storage unit 34b to move the storage object by gripping the storage object. Thus, even in a case where the storage object is stored in any storage unit 34b of multiple (seven) storage units 34b, storage device 40 of the present embodiment can substantially equalize a movement distance of actuator 35. Therefore, for example, as compared with a case where multiple (seven) storage units 34b are provided in a straight line, storage device 40 of the present embodiment can miniaturize and simplify actuator 35.

1-4. Storage Device 40

Figure 5:
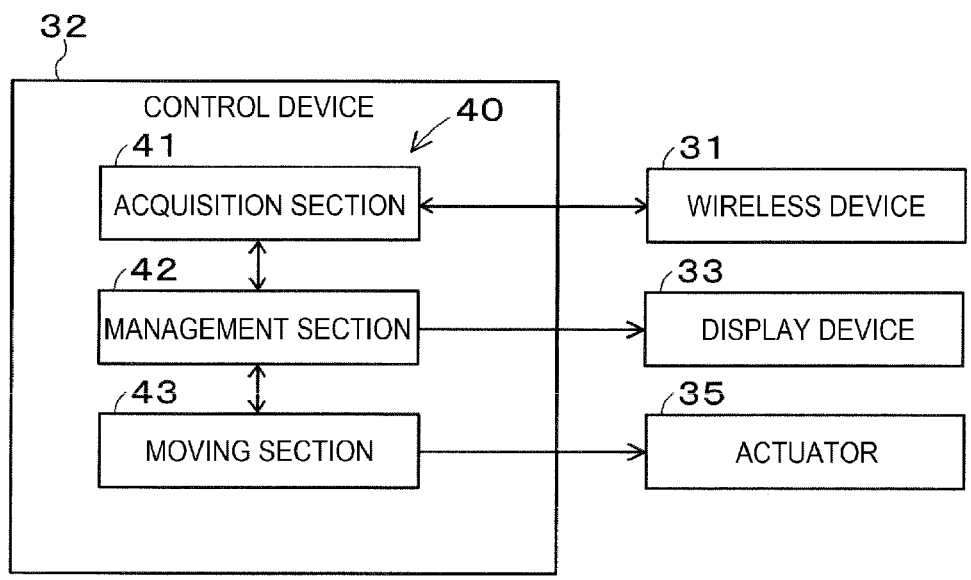
FIG. 5 is a block diagram illustrating an example of a control block of storage device 40.

When case 21 accommodating multiple (six) accommodatable objects 22 is loaded into storage container 30, storage device 40 acquires both specific information ID1 and identification information ID21 to ID26, and manages case 21 and each of multiple (six) accommodatable objects 22 by associating with each other. Storage device 40 includes acquisition section 41 and management section 42 when viewed as a control block. In addition, it is preferable that storage device 40 further includes moving section 43. As illustrated in FIG. 5, storage device 40 of the present embodiment includes acquisition section 41, management section 42, and moving section 43. In the present embodiment, acquisition section 41, management section 42, and moving section 43 are provided in control device 32 of storage container 30.

Figure 6:
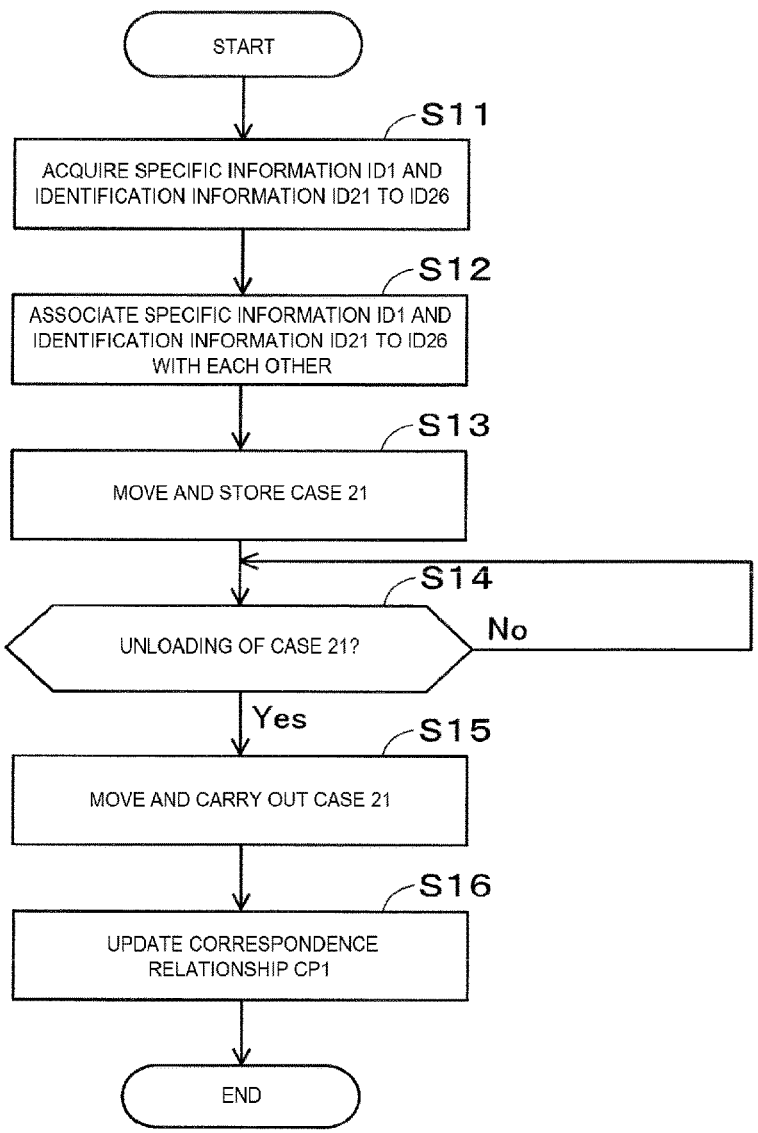
FIG. 6 is a flowchart illustrating an example of a control procedure by storage device 40.

Further, storage device 40 executes control according to the flowchart illustrated in FIG. 6. Acquisition section 41 performs the process illustrated in step S11. Management section 42 performs the processes illustrated in steps S12 and S16. Moving section 43 performs the processes illustrated in steps S13 and S15. In addition, moving section 43 performs the determination illustrated in step S14.

1-4-1. Acquisition Section 41

Acquisition section 41 performs wireless communication with both first wireless tag 23 and second wireless tag 24 by using wireless device 31 provided at entrance 30a of storage container 30 when case 21 accommodating multiple (six) accommodatable objects 22 is loaded into storage container 30. As described above, first wireless tag 23 is attached to case 21. Second wireless tag 24 is attached to each of multiple (six) accommodatable objects 22. Acquisition section 41 acquires specific information ID1 for specifying case 21 memorized in first wireless tag 23 and identification information ID21 to ID26 for identifying each of multiple (six) accommodatable objects 22 memorized in second wireless tag 24, from wireless device 31 (step S11 illustrated in FIG. 6).

As illustrated in FIG. 2A, case 21 has at least one accommodation region capable of accommodating multiple (six) accommodatable objects 22. For example, case 21 accommodating multiple (six) trays 22c illustrated in FIG. 2A has one accommodation region. In this case, acquisition section 41 acquires specific information ID1 for specifying case 21 and identification information ID21 to ID26 for identifying each of multiple (six) accommodatable objects 22 accommodated in one accommodation region, from wireless device 31. For example, case 21 accommodating multiple (six) reels 22a and case 21 accommodating multiple (six) solder containers 22d have multiple (six) accommodation regions A11 to A16. In this case, acquisition section 41 can acquire specific information ID1 for specifying case 21 and identification information ID21 to ID26 for each accommodation region, from wireless device 31.

Figure 2B:
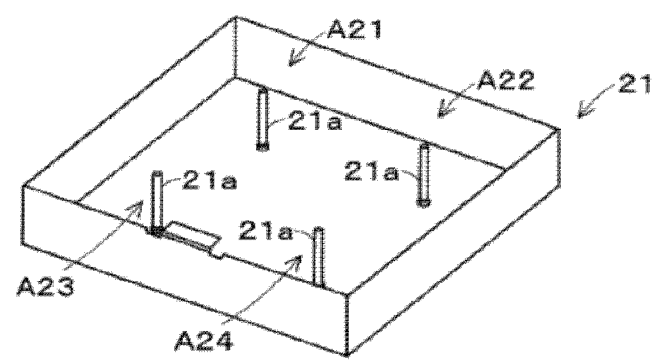
Figure 2C:
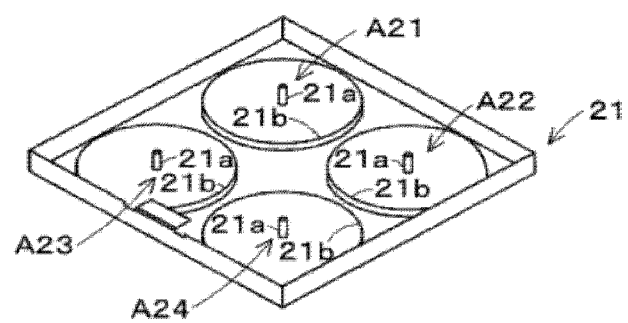

As described above, in a case where case 21 has multiple (six) accommodation regions A11 to A16, wireless device 31 may have directivity capable of wireless communication for each accommodation region of multiple (six) accommodation regions A11 to A16. In the present embodiment, one wireless device 31 sequentially moves to each of multiple (six) accommodation regions A11 to A16 to perform wireless communication. In addition, multiple (six) wireless devices 31 can perform wireless communication in each of multiple (six) accommodation regions A11 to A16. Multiple (six) accommodation regions A11 to A16 can be formed by, for example, a partition plate, a pin, or the like. As illustrated in FIG. 2B, in case 21, accommodation regions A21 to A24 are formed by multiple (four) pins 21a. As illustrated in FIG. 2C, in case 21, accommodation regions A21 to A24 are formed by multiple (four) pins 21a and multiple (four) pedestal sections 21b. In this case, a reel diameter of reel 22a to be accommodated can be designated by a size of pedestal section 21b, and the reel diameter of reel 22a to be accommodated can be informed to the operator. The number and size of the accommodation region can be set in any manner. Further, the accommodation regions illustrated in FIGS. 2A to 2C are examples.

1-4-2. Management Section 42

Management section 42 associates specific information ID1 acquired by acquisition section 41 with identification information ID21 to ID26 and manages correspondence relationship CP1 between specific information ID1 and identification information ID21 to ID26 (in step S12 illustrated in FIG. 6). It is preferable that management section 42 further associates and manages at least one of positional information, accommodatable object information, loading and unloading information, and storage information in correspondence relationship CP1. The positional information indicates a storage location of case 21. The accommodatable object information indicates information on multiple (six) accommodatable objects 22. As described above, the accommodatable object information may include, for example, the types (for example, component types) of multiple (six) accommodatable objects 22, the format, the number of inventories (remaining number), the vendor name, the expiration date, and the like. The loading and unloading information indicates a loading date and time and an unloading date and time of multiple (six) accommodatable objects 22. The storage information indicates at least one of an atmosphere temperature and humidity in storage container 30.

FIG. 7 illustrates an example of correspondence relationship CP1. In correspondence relationship CP1 illustrated in FIG. 7, specific information, identification information, accommodatable object information, loading and unloading information, positional information, and storage information are associated. Specifically, case 21 specified by specific information ID1 is associated with accommodation of multiple (six) accommodatable objects 22 identified by identification information ID21 to ID26. In addition, multiple (five) accommodatable objects 22 identified by identification information ID21, ID22, ID24 to ID26 are associated with accommodatable objects indicated by accommodatable object information P1. Accommodatable object 22 identified by identification information ID23 is associated with an accommodatable object indicated by accommodatable object information P2.

Further, multiple (six) accommodatable objects 22 identified by identification information ID21 to ID26 are associated with a loading date and time being, for example, 8:00 a.m. on Dec. 18, 2017. Multiple (six) accommodatable objects 22 are in a state of being stored in storage container 30, and can be associated with an unloading date and time. Further, case 21 specified by specific information ID1 is associated with being stored in a storage location indicated by positional information T1B1. Further, case 21 specified by specific information ID1 is associated with being stored in storage container 30 in a state in which an atmosphere temperature is temperature TE1 and humidity is humidity HU1 in storage container 30.

With the present embodiment, management section 42 associates specific information ID1 acquired by acquisition section 41 with identification information ID21 to ID26 and manages correspondence relationship CP1 between specific information ID1 and identification information ID21 to ID26. In addition, management section 42 further associates and manages at least one of positional information, accommodatable object information, loading and unloading information, and storage information in correspondence relationship CP1. Thus, when case 21 and each of multiple (six) accommodatable objects 22 are managed by associating with each other, management section 42 can manage information related to storage by associating with each other.

In a case where case 21 has multiple (six) accommodation regions A11 to A16, it is preferable that management section 42 further associates and manages region information indicating accommodation regions A11 to A16. In correspondence relationship CP1 illustrated in FIG. 7, accommodation region A11 is associated with accommodation of accommodatable object 22 identified by identification information ID21. The above description also can be applied to accommodation regions A12 to A16 in the same manner.

For example, by collectively accommodating different types of accommodatable objects 22 (for example, reels 22*a*), management section 42 can easily reduce a free space and increase an accommodation capacity of storage section 34 as compared with case 21 used for each of accommodatable objects 22 (for example, reels 22*a*) having the same type. Further, for example, management section 42 can simplify the loading and unloading operation and shorten the loading and unloading time by collectively accommodating accommodatable object 22 (reels 22*a*) used in a specific production in one case 21.

In addition, it is preferable that management section 42 determines whether accommodatable objects 22 having different types are accommodated in specific regions AS1 to AS3, which is at least one region of accommodation regions A11 to A16, in which accommodatable objects 22 having the same type are to be accommodated. It is preferable that management section 42 informs of the mixture of accommodatable objects 22 having different types when accommodatable objects 22 having different types are accommodated in specific regions AS1 to AS3. For example, management section 42 can improve a storage capability of storage section 34 by collectively accommodating the same type of accommodatable objects 22 (for example, reels 22*a*) in specific regions AS1 to AS3, so that it is possible to facilitate the loading and unloading operation and the management of accommodatable objects 22 (reels 22*a*). Further, for example, management section 42 collectively accommodates the same type of accommodatable objects 22 (reels 22*a*) having a use frequency of accommodatable object 22 (reel 22*a*) higher than a predetermined level in specific regions AS1 to AS3, it is possible to simplify the loading and unloading operation and to shorten the loading and unloading time.

For example, as illustrated in FIG. 2A, it is assumed that accommodation region A11 is specific region AS1. In the same manner, it is assumed that accommodation region A12 is specific region AS2 and accommodation region A13 is specific region AS3. At this time, for example, as illustrated in FIG. 7, it is assumed that accommodatable object information of accommodatable object 22 accommodated in accommodation region A13 (specific region AS3) and identified by identification information ID23 is accommodatable object information P2 in correspondence relationship CP1. In this case, accommodatable object information P2 of accommodation region A13 (specific region AS3) is different from accommodatable object information P1 of accommodation region A11 (specific region AS1) and accommodation region A12 (specific region AS2). Therefore, management section 42 determines that accommodatable objects 22 having different types are accommodated in specific regions AS1 to AS3 and informs of the mixture of accommodatable objects 22 having the different types (accommodatable objects 22 identified by identification information ID23).

Whether the types of accommodatable objects 22 are different from each other can be determined by, for example, selecting any information among types of multiple (six) accommodatable objects 22 (for example, component types), a form, a vendor name, and the like. For example, in display device 33 illustrated in FIG. 3A, management section 42 can display the mixture of accommodatable objects 22 having different types (accommodatable objects 22 identified by identification information ID23). In this case, the operator uses the touch panel (display device 33 functioning as an input device) to instruct control device 32 of storage container 30 to unload case 21 carried in storage container 30, and unloads case 21 carried in storage container 30. Moving section 43 to be described below may automatically unload case 21. The operator changes the arrangement of accommodatable objects 22 so that accommodatable objects 22 having the same type are accommodated in specific regions AS1 to AS3. At this time, management section 42 may display accommodation region A13 and accommodatable object information P2 of accommodatable object 22 which is a change target. In addition, management section 42 may display and inform of the accommodation region of a change destination (in this case, any one of accommodation regions A14 to A16).

Further, multiple accommodatable objects 22 can be accommodated in each of accommodation regions A11 to A16. FIG. 8 illustrates another example of correspondence relationship CP1. For example, FIG. 8 illustrates an example of correspondence relationship CP1 in a case where multiple (three) accommodatable objects 22 are accommodated in accommodation region A11. Identification information for identifying each of multiple (three) accommodatable objects 22 is indicated by identification information ID211 to ID213. For example, it is assumed that accommodation region A11 is specific region AS1.

For example, as illustrated in FIG. 8, it is assumed that accommodatable object information of accommodatable object 22 accommodated in accommodation region A11 (specific region AS1) and identified by identification information ID211 is accommodatable object information P1. It is assumed that accommodatable object information of accommodatable object 22 accommodated in accommodation region A11 (specific region AS1) and identified by identification information ID212 is accommodatable object information P2. It is assumed that accommodatable object information of accommodatable object 22 accommodated in accommodation region A11 (specific region AS1) and identified by identification information ID213 is accommodatable object information P1.

In this case, accommodatable object information P2 of accommodatable object 22 identified by identification information ID212 is different from accommodatable object information P1 of accommodatable object 22 identified by identification information ID211 and accommodatable object information P1 of accommodatable object 22 identified by identification information ID213. Therefore, management section 42 determines that accommodatable objects 22 having different types are accommodated in specific region AS1 and informs of the mixture of accommodatable objects 22 having the different types (accommodatable objects 22 identified by identification information ID212). For example, in display device 33 illustrated in FIG. 3A, management section 42 can display the mixture of accommodatable objects 22 having different types (accommodatable objects 22 identified by identification information ID212). In addition, the operator can change the arrangement of accommodatable objects 22 having different types, for example, accommodatable objects 22 identified by identification information ID212, in the same manner as the above-described case.

With the present embodiment, management section 42 determines whether accommodatable objects 22 having different types are accommodated in specific regions AS1 to AS3, which is at least one region of accommodation regions A11 to A16, in which accommodatable objects 22 having the same type are to be accommodated. Management section 42 informs of the mixture of accommodatable objects 22 having different types when accommodatable objects 22 having different types are accommodated in specific regions AS1 to AS3. Thus, the operator can know that accommodatable objects 22 having different types are accommodated in specific regions AS1 to AS3.

In addition, it is preferable that management section 42 informs of the difference between multiple (six) accommodatable objects 22 accommodated in case 21 based on identification information acquired by acquisition section 41 before case 21 is unloaded from storage container 30 and identification information acquired by acquisition section 41 when case 21 is loaded into storage container 30 again. For example, in correspondence relationship CP1 illustrated in FIG. 7, it is assumed that the identification information acquired by acquisition section 41 before case 21 is unloaded from storage container 30 is identification information ID21 to ID26. Further, it is assumed that the identification information acquired by acquisition section 41 when case 21 is loaded into storage container 30 again is identification information ID21 to ID25. In this case, identification information ID26 is different in correspondence relationship CP1, and management section 42 informs of the difference between multiple (six) accommodatable objects 22 accommodated in case 21. In this case, management section 42 can also inform that accommodatable object 22 identified by identification information ID26 is unloaded from case 21.

On the other hand, in correspondence relationship CP1, it is assumed that the identification information acquired by acquisition section 41 before case 21 is unloaded from storage container 30 is identification information ID21 to ID25. Further, it is assumed that the identification information acquired by acquisition section 41 when case 21 is loaded into storage container 30 is identification information ID21 to ID26. Also in this case, identification information ID26 is different in correspondence relationship CP1, and management section 42 informs of the difference between multiple (six) accommodatable objects 22 accommodated in case 21. Meanwhile, in this case, management section 42 can inform that accommodatable object 22 identified by identification information ID26 is accommodated in case 21.

In any case, management section 42 can display, for example, the difference between multiple (six) accommodatable objects 22 accommodated in case 21 on display device 33 illustrated in FIG. 3A. Further, accommodatable object 22 unloaded from case 21 may be all or some of multiple (six) accommodatable object 22 accommodated in case 21. In the same manner, accommodatable object 22 accommodated in case 21 may be all or some of multiple accommodatable object 22 accommodatable in case 21.

With the present embodiment, management section 42 informs of the difference between multiple (six) accommodatable objects 22 accommodated in case 21 based on identification information acquired by acquisition section 41 before case 21 is unloaded from storage container 30 and identification information acquired by acquisition section 41 when case 21 is loaded into storage container 30 again. Thus, the operator can know accommodatable object 22 (unloaded accommodatable object 22 or newly accommodated accommodatable object 22) which increases or decreases when case 21 is loaded and unloaded.

Here, it is assumed that case 21 is loaded again into storage container 30 after case 21 is unloaded from storage container 30 and then target accommodatable objects TG2, which are all or some accommodatable objects 22 of multiple accommodatable objects 22 accommodated in case 21, are unloaded. In this case, it is preferable that management section 42 calculates a difference between the identification information acquired by acquisition section 41 before case 21 is unloaded from storage container 30 and the identification information acquired by acquisition section 41 when case 21 is loaded into storage container 30 again. It is preferable that management section 42 specifies target accommodatable object TG2 unloaded from case 21 based on the difference and informs of erroneous unloading of target accommodatable object TG2 when identification information of specified target accommodatable object TG2 does not coincide with identification information of target accommodatable object TG2 to be unloaded.

Figure 9:
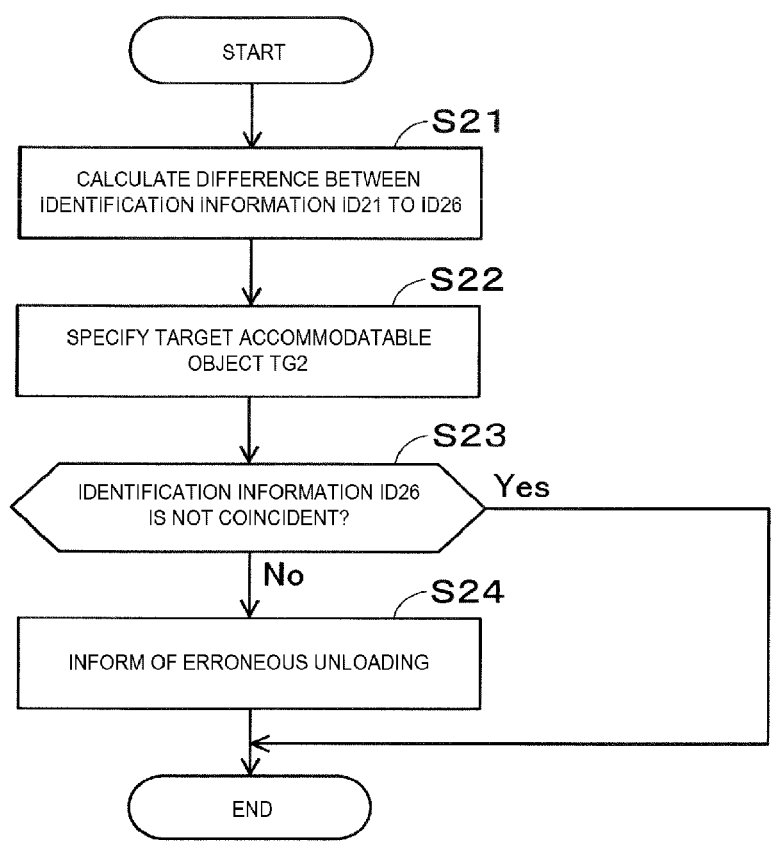
FIG. 9 is a flowchart illustrating an example of a control procedure by management section 42.

For example, in correspondence relationship CP1 illustrated in FIG. 7, it is assumed that the identification information acquired by acquisition section 41 before case 21 is unloaded from storage container 30 is identification information ID21 to ID26. Further, it is assumed that the identification information acquired by acquisition section 41 when case 21 is loaded into storage container 30 again is identification information ID21 to ID25. In this case, management section 42 calculates a difference between identification information ID21 to ID26 and identification information ID21 to ID25 (step S21 illustrated in FIG. 9). In this case, the difference is identification information ID26. Management section 42 specifies target accommodatable object TG2 unloaded from case 21 based on the difference (step S22). In this case, target accommodatable object TG2 is accommodatable object 22 identified by identification information ID26.

Next, management section 42 determines whether identification information ID26 of specified target accommodatable object TG2 coincides with identification information of target accommodatable object TG2 to be unloaded (step S23). As described above, host computer 19 notifies control device 32 of occurrence of changeover in board work line 10L, occurrence of shortage of articles to be supplied to board work line 10L, or occurrence of a possibility of the changeover or the shortage of the articles. Management section 42 can set target accommodatable object TG2 to be unloaded based on the notification, for example. In a case where the operator uses the touch panel (display device 33 functioning as an input device) to designate an article (accommodatable object 22) to be unloaded from storage container 30, management section 42 sets the article to target accommodatable object TG2 to be unloaded.

In a case where the identification information is not coincident with the identification information (NO in step S23), management section 42 informs of erroneous unloading of target accommodatable object TG2 (step S24). The control is temporarily completed. Specifically, management section 42 informs of that target accommodatable object TG2 (accommodatable object 22 identified by identification information ID26) unloaded from case 21 is not target accommodatable object TG2 to be unloaded (erroneous unloading). Management section 42 can display, for example, the erroneous unloading on display device 33 illustrated in FIG. 3A. In this case, the operator returns unloaded target accommodatable object TG2, for example, accommodatable object 22 identified by identification information ID26, to case 21, and takes out target accommodatable object TG2 to be unloaded, from case 21. In a case where the identification information is coincident with the identification information (YES in step S23), the control is temporarily completed. In this case, target accommodatable object TG2 to be unloaded (accommodatable object 22 identified by identification information ID26) is unloaded from case 21.

With the present embodiment, management section 42 calculates a difference between identification information ID21 to ID26 acquired by acquisition section 41 before case 21 is unloaded from storage container 30 and identification information ID21 to ID25 acquired by acquisition section 41 when case 21 is loaded into storage container 30 again. Management section 42 specifies target accommodatable object TG2 unloaded from case 21 based on the difference and informs of erroneous unloading of target accommodatable object TG2 when identification information ID26 of specified target accommodatable object TG2 does not coincide with identification information of target accommodatable object TG2 to be unloaded. Thus, the operator can take out target accommodatable object TG2 to be unloaded, from case 21.

1-4-3. Moving Section 43

Moving section 43 moves case 21 carried in entrance 30a of storage container 30 to predetermined storage space 34b2 and stores case 21, when case 21 is loaded. Moving section 43 moves case 21 stored in storage space 34b2 to exit 30b of storage container 30 to carry out case 21, at the time of case 21 being unloaded. Further, it is preferable that when case 21 is loaded, by using actuator 35, moving section 43 grips case 21 carried into entrance 30a and moves case 21 to storage unit 34b including storage space 34b2 capable of storing case 21 to store case 21 in storage space 34b2. It is preferable that when case 21 is unloaded, by using actuator 35, moving section 43 grips case 21 stored in storage space 34b2 and moves case 21 to exit 30b to carry out case 21.

In the present embodiment, when case 21 is loaded, by using actuator 35 illustrated in FIG. 3B, moving section 43 grips case 21 carried into the workspace 34a of entrance 30a to move case 21 to storage unit 34b (step S13 illustrated in FIG. 6). Storage unit 34b includes storage space 34b2 capable of storing case 21. As illustrated in FIG. 7, case 21 specified by specific information ID1 is accommodated in storage space 34b2 indicated by positional information T1B1 illustrated in FIG. 4. Therefore, moving section 43 uses actuator 35 to store case 21 in storage space 34b2 (step S13 illustrated in FIG. 6).

Next, moving section 43 determines whether case 21 is at the time of unloading (step S14). As described above, host computer 19 notifies control device 32 of occurrence of changeover in board work line 10L, occurrence of shortage of articles to be supplied to board work line 10L, or occurrence of a possibility of the changeover or the shortage of the articles. Moving section 43 can unload case 21 based on the notification, for example. In a case where the operator designates an article (accommodatable object 22) to be unloaded from storage container 30 by using the touch panel (display device 33 functioning as an input device), moving section 43 can unload case 21 in which the designated article (accommodatable object 22) is accommodated.

In a case where case 21 is unloaded (in a case of Yes in step S14), by using actuator 35, moving section 43 grips case 21 stored in storage space 34b2 and moves case 21 to exit 30b to carry out case 21 (step S15). In a case where case 21 is not at the time of unloading (No in step S14), the control returns to the determination illustrated in step S14. That is, moving section 43 waits until case 21 needs to be unloaded.

With the present embodiment, moving section 43 moves case 21 carried in entrance 30a of storage container 30 to predetermined storage space 34b2 and stores case 21, when case 21 is loaded. In addition, moving section 43 moves case 21 stored in storage space 34b2 to exit 30b of storage container 30 and carries out case 21, when case 21 is unloaded. Thus, storage device 40 can store case 21 in predetermined storage space 34b2 in accordance with the loading of case 21, and storage device 40 can carry out case 21 in accordance with the unloading of case 21.

Further, with the present embodiment, when case 21 is loaded, by using actuator 35, moving section 43 grips case 21 carried into entrance 30a and moves case 21 to storage unit 34b including storage space 34b2 in which case 21 can be stored to store case 21 in storage space 34b2. In addition, when case 21 is unloaded, by using actuator 35, moving section 43 grips case 21 stored in storage space 34b2 and moves case 21 to exit 30b to carry out case 21. Thus, storage device 40 can automate the storage and the carrying out of case 21.

When case 21 is carried out, management section 42 updates correspondence relationship CP1 (step S16). The control is temporarily completed. For example, when case 21 is unloaded, acquisition section 41 acquires specific information ID1 and identification information ID21 to ID26. Management section 42 can update correspondence relationship CP1 based on specific information ID1 and identification information ID21 to ID26 acquired by acquisition section 41. Specifically, in correspondence relationship CP1 illustrated in FIG. 7, management section 42 associates the unloading dates and times of unloaded accommodatable objects 22 with each other.

The loading and unloading information may be recorded (additionally) in progress each time loading or unloading is performed. In a case where there is a difference in multiple (six) accommodatable objects 22 when case 21 is loaded and unloaded, management section 42 may update the loading and unloading information on accommodatable object 22 having the difference. Further, for example, in a case where case 21 is loaded again in storage container 30 after case 21 is unloaded from storage container 30 and target accommodatable object TG2 is unloaded, management section 42 may record the unloading date and time of specified target accommodatable object TG2.

2. Storage Method

The above description for storage device 40 also can be applied to a storage method in the same manner. Specifically, control performed by acquisition section 41 corresponds to an acquisition step. That is, in the acquisition step, when case 21 accommodating multiple (six) accommodatable objects 22 is loaded into storage container 30, wireless communication is performed with both first wireless tag 23 attached to case 21 and second wireless tag 24 attached to each of multiple (six) accommodatable objects 22 by using wireless device 31 provided at entrance 30a of storage container 30. The acquisition step is a step of acquiring specific information ID1 for specifying case 21 memorized in first wireless tag 23 and identification information ID21 to ID26 for identifying each of multiple (six) accommodatable objects 22 memorized in second wireless tag 24.

Control performed by management section 42 corresponds to a management step. That is, the management step is a step of managing correspondence relationship CP1 between specific information ID1 and identification information ID21 to ID26 by associating specific information ID1 and identification information ID21 to ID26 acquired in the acquisition step. In the same manner, control performed by moving section 43 corresponds to a movement step. Also in the storage method, the same operation and effect as storage device 40 can be acquired.

3. Example of Effect of Embodiment

Storage device 40 includes acquisition section 41 and management section 42. Thus, when case 21 accommodating multiple (six) accommodatable objects 22 is loaded into storage container 30, storage device 40 can acquire both specific information ID1 and identification information ID21 to ID26, and can easily manage case 21 and each of multiple (six) accommodatable objects 22 by associating with each other. The above description for storage device 40 also can be applied to the storage method in the same manner.

REFERENCE SIGNS LIST

10L: board work line, 10a: printer, 10c: component mounter, 21: case, 22: accommodatable object, 22a: reel, 22b: feeder, 22c: tray, 22d: solder container, 23: first wireless tag, 24: second wireless tag, 30: storage container, 30a: entrance, 30b: exit, 31: wireless device, 34: storage section, 34b: storage Unit, 34b2: storage space, 35: actuator, 40: storage device, 41: acquisition section, 42: management section, 43: moving section, 90: board, A11 to A16, A21 to A24: accommodation region, AS1 to AS3: specific region, CP1: correspondence relationship, ID1: specific information, ID21 to ID26, identification information. TG2: target accommodatable object

The invention claimed is:

1. A storage device comprising:
a storage container including multiple storage units each configured to hold at least a case accommodating multiple accommodatable objects; and
control circuitry configured to
perform wireless communication with both a first wireless tag attached to the case loaded in the storage container and a second wireless tag attached to each of the multiple accommodatable objects by using a wireless device provided at an entrance of the storage container to acquire specific information for specifying the case memorized in the first wireless tag and identification information for identifying each of the multiple accommodatable objects memorized in the second wireless tag,
associate the specific information and the identification information with each other to manage a correspondence relationship between the specific information and the identification information, and
inform of a difference between the multiple accommodatable objects accommodated in the case based on the identification information before the case is unloaded from the storage container and the identification information when the case is loaded into the storage container again.

2. The storage device according to claim 1,
wherein the case includes at least one accommodation region configured to accommodate the multiple accommodatable objects, and
wherein the control circuitry determines whether accommodatable objects having different types are accommodated in a specific region, which is at least one region among the accommodation regions and in which accommodatable objects having the same type are to be accommodated, and informs of mixture of the accommodatable objects having the different types when the accommodatable objects having the different types are accommodated in the specific region.

3. The storage device according to claim 1,
wherein when the case is loaded again into the storage container after the case is unloaded from the storage container and target accommodatable objects which are all or some of the multiple accommodatable objects accommodated in the case are unloaded, the control circuitry specifies the target accommodatable object unloaded from the case based on a difference between the identification information before the case is unloaded from the storage container and the identification information when the case is loaded again into the storage container, and informs of erroneous unloading of the target accommodatable object when the identification information of the specified target accommodatable object does not coincide with the identification information of the target accommodatable object to be unloaded.

4. The storage device according to claim 1,
wherein the control circuitry manages the correspondence relationship by further associating at least one of positional information indicating a storage location of the case, accommodatable object information indicating information related to the multiple accommodatable objects, loading and unloading information indicating a loading date and time and an unloading date and time of the multiple accommodatable objects, and storage information indicating at least one of an atmosphere temperature and humidity in the storage container.

5. The storage device according to claim 1,
wherein the control circuitry is configured to move the case carried into the entrance of the storage container to a predetermined storage space to store the case at a time of loading the case, and move the case stored in the storage space to an exit of the storage container to carry out the case at a time of unloading the case.

6. The storage device according to claim 5,
wherein the multiple storage units are provided along a vertical direction, the multiple storage units being arranged in a circular shape when viewed in the vertical direction,
wherein an actuator is provided inside the multiple storage units when viewed in the vertical direction, and configured to grip the case to move the case, and
wherein the actuator grips the case carried into the entrance and moves the case to the storage unit including the storage space capable of storing the case to store the case in the storage space at a time of loading the case, and grips the case stored in the storage space and moves the case to the exit to carry out the case at a time of unloading the case.

7. A storage device comprising:
a storage container including multiple storage units each configured to hold at least a case accommodating multiple accommodatable objects; and
control circuitry configured to
perform wireless communication with both a first wireless tag attached to the case loaded in the storage container and a second wireless tag attached to each of the multiple accommodatable objects by using a wireless device provided at an entrance of the storage container to acquire specific information for specifying the case memorized in the first wireless tag and identification information for identifying each of the multiple accommodatable objects memorized in the second wireless tag, and
associate the specific information and the identification information with each other to manage a correspondence relationship between the specific information and the identification information,
wherein the multiple accommodatable objects are supplied to a board work line including a printer which prints paste-like solder at a mounting position of a component in a board, and at least one component mounter which mounts the component on the solder printed by the printer, and
wherein the multiple accommodatable objects are a reel around which a component tape for accommodating the component is wound, a feeder on which the reel is rotatably and removably provided, a tray on which the components are arranged, or a solder container containing the solder.

8. A storage method comprising:
an acquisition step of performing, when a case accommodating multiple accommodatable objects is loaded into a storage container, wireless communication with both a first wireless tag attached to the case and a second wireless tag attached to each of the multiple accommodatable objects by using a wireless device provided at an entrance of the storage container to acquire specific information for specifying the case memorized in the first wireless tag and identification information for identifying each of the multiple accommodatable objects memorized in the second wireless tag;
a management step of associating the specific information and the identification information acquired in the acquisition step with each other to manage a correspondence relationship between the specific information and the identification information: and
an information step of informing of a difference between the multiple accommodatable objects accommodated in the case based on the identification information before the case is unloaded from the storage container and the identification information when the case is loaded into the storage container again.

* * * * *